Sept. 28, 1937.　　　R. P. JACKSON　　　2,094,490
DISCONNECTING SWITCH
Filed July 31, 1936　　　2 Sheets-Sheet 2
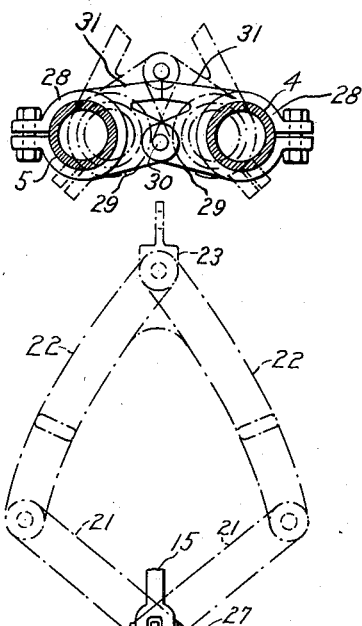
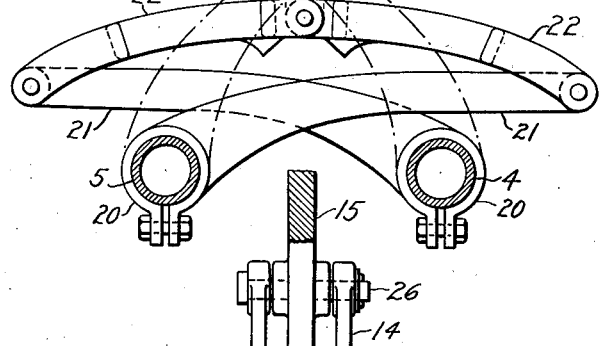
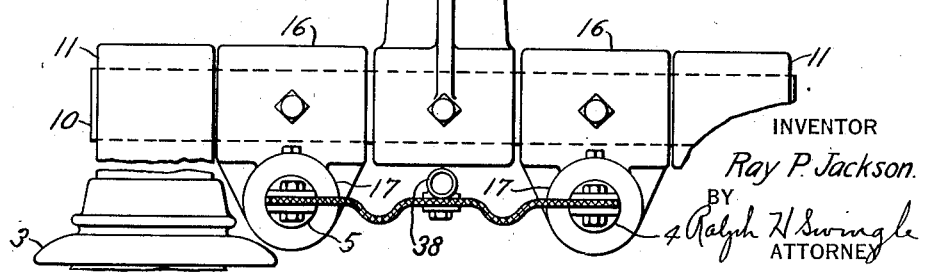
INVENTOR
Ray P. Jackson.
BY
Ralph N. Swingle
ATTORNEY Patented Sept. 28, 1937

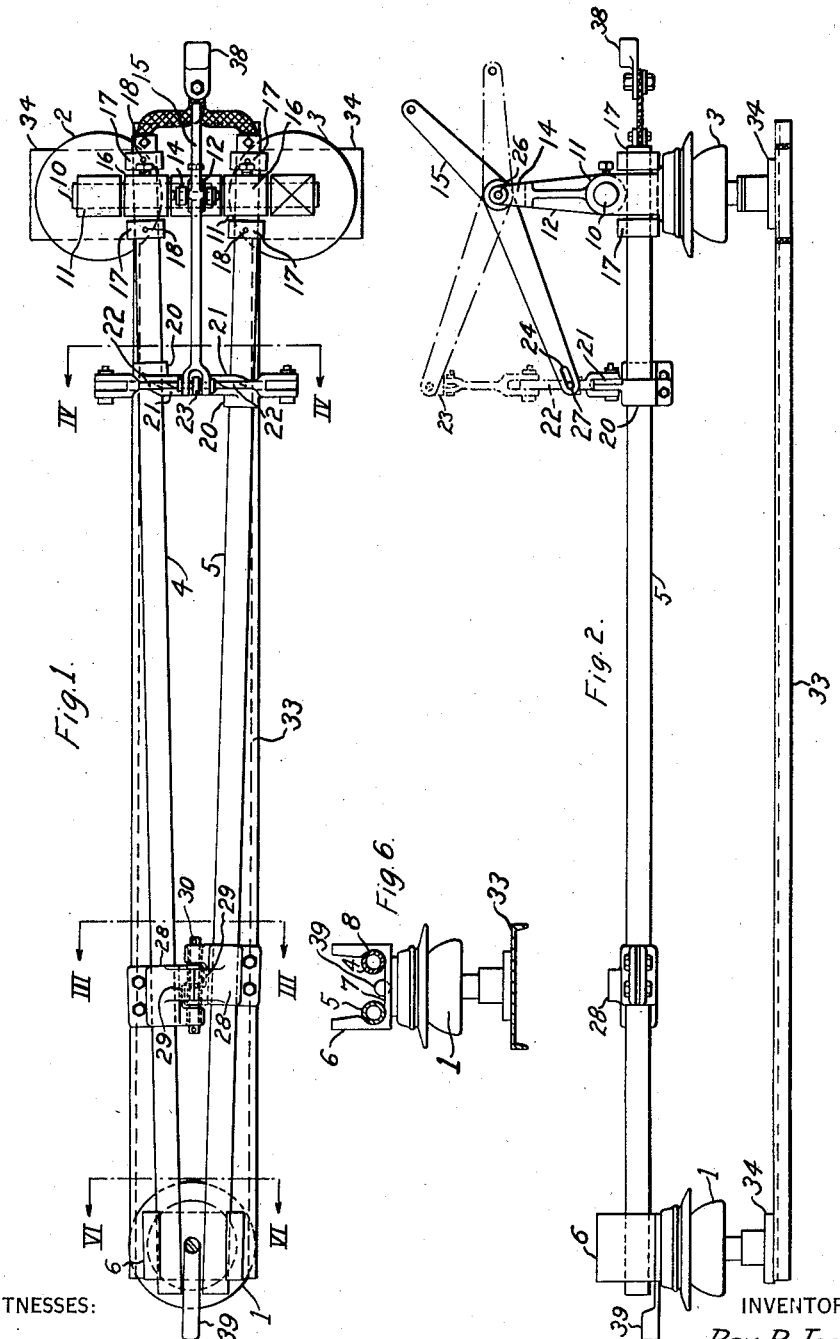

2,094,490

UNITED STATES PATENT OFFICE 2,094,490

DISCONNECTING SWITCH

Ray P. Jackson, Wilkinsburg, Pa., assignor to Westinghouse Electric & Manufacturing Company, East Pittsburgh, Pa., a corporation of Pennsylvania Application July 31, 1936, Serial No. 93,583

14 Claims. (Cl. 200—48)

This invention relates to disconnect switches, and particularly to those which are operated by link mechanism from a distance.

It is an object of this invention to provide a switch which shall ensure easy and certain closing and be inexpensive to manufacture and install.

It is a further object of this invention to provide a switch which will automatically clear itself of ice, dirt or corrosion, and afford high contact pressures without requiring excessive mechanical force or friction for the purpose.

It is a further object of this invention to devise a switch which may establish connection between parts on two insulating supports remote from one another.

Other objects of the invention and details of the proposed structure will be apparent from the following description and the accompanying drawings in which:

Figure 1 is a plan view;

Fig. 2 is a view in side elevation thereof;

Fig. 3 is an enlarged sectional view taken along the line III—III of Fig. 1;

Fig. 4 is an enlarged sectional view taken along the line IV—IV of Fig. 1;

Fig. 5 is an enlarged end elevational view of the structure shown in Fig. 2; and Fig. 6 is a sectional view taken along the line VI—VI of Fig. 1.

The switch establishes connection between an insulating support 1 and other insulating supports of which in the specific illustration chosen there are a pair 2 and 3. The connection is established by means of a pair of brass or copper rods or tubes 4 and 5, which cooperate with jaws 6 most clearly illustrated in Fig. 6. The jaws constitute two up-rights connected by a cross member 7. Each upright is equipped with a hollowed or rounded portion 8 into which the rods or tubes 4 and 5 fit.

Between the supports 2 and 3, a shaft 10 extends. The shaft 10 is mounted in bearings 11 each supported on one of the insulators 2 and 3. At the center of the shaft 10 there is clamped an arm 12, at the upper end of which is a stirrup 14 in which is pivoted a lever 15. On each side of the clamp for the arm 12, clamps 16 are provided which support bearings 17. The bearings 17 support the rods 4 and 5 which may be capable of a sliding motion through the bearings or may be confined by collars on each side of the bearings. The collars may not completely prevent sliding motion but may limit the same to a small movement. For this purpose the collars are secured to the rods by set screws shown best at 18 in Fig. 1.

At a distance from the bearings 17, clamps 20 are secured to each of the rods 4 and 5. Each of the clamps 20 is secured upon its rod at the same distance from the bearing 17 upon that rod, and each clamp 20 has an arm 21, which is one element of a toggle secured thereto. (See Fig. 4.) A cooperating element or link 22 is pivoted to the end of each of the arms 21. At the other end, each element 22 is pivotally secured to a clevis 23, by which it is pivotally secured at the end of the lever 15 which extends toward the jaws 6.

If necessary, the lever is provided with a slot 24 for accommodation of the lost motion when the lever is moved about its pivot 26 at the upper end of the arm 12. If sufficient sliding movement for the rods 4 and 5 in their bearings 17 to accommodate this lost motion is provided, the slot 24 may be a mere journal cooperating with the pin 27 of the clevis.

Nearer the jaws 6 a pair of clamps 28 are provided engaging the rods 4 and 5. These clamps each have an arm 29 which arms are pivoted together at 30. The arms also carry a pair of abutting branches 31 as seen in Fig. 3.

To support the switch as a whole, a base 33 is provided beneath the insulating supports 1, 2 and 3. It is equipped with bed plates 34 under each stand. The device is also furnished with terminals 38 and 39 and flexible conductors leading from the bars 4 and 5 to the terminal 38. The terminal 39 is preferably in permanent contact with the cross piece 7.

In the operation of the device, assuming the parts in the position illustrated in full lines in Fig. 2, the switch is opened by exerting a pull on the right-hand end of the lever 15 as shown in this figure. The connection to lever 15 is not illustrated, but a hole in the end of the lever is shown by which it may be connected to any suitable insulated operating linkage. During the first part of the opening movement of this lever, until it assumes the position shown in dotted lines in Fig. 2, the operation which takes place does not move the rods 4 and 5 about the axis of shaft 10. The effect of the first part of the movement will be described later.

When the lever 15 is moved to the position shown in dotted lines in Fig. 2, the parts shown in Fig. 4 are also in the position shown there in dotted lines, and the clevis 23 cannot be moved further from the rods 4 and 5. Consequently, the lever 15 can no longer move about the pin 26, but its motion is accompanied by a movement of the arm 12 and a consequent rotation of the shaft 10 in the bearings 11. This movement turns the rods 4 and 5 about the axis of the shaft 10 and rotates them away from the jaws 6 to their open position.

Preferably this opening movement is performed after the circuit has already been opened, for example, by a circuit breaker. Consequently, no arcing need be provided against, and if the ends of the rods 4 and 5 leave the jaws 6 slowly, no harm results. When the switch is to be closed, it is also true that the circuit is open at another point, such as at a circuit breaker, and the closing movement may be leisurely for the same reason.

To close the switch, force is supplied at the right-hand end of the lever 15, as seen in Fig. 2, causing it to rotate counter-clockwise until it has reached the position shown in dotted lines. In this position the toggle comprising elements 21 and 22 and uniting the rods or tubes 4 and 5 to the clevis 23 at the end of the lever 15, is extended to its full length, occupying the position shown in dotted lines in Fig. 4, and the arms 21 are more nearly vertical than they are when the device has reached the full line position.

Movement of the lever 15 further in the closing direction is a rotation about pivot 26 counter-clockwise, as seen in Fig. 2, and causes the clevis 23 to descend, with the result that the toggle comprising two pairs of elements 21 and 22 widens and the elements 22 make a more obtuse angle with each other while the elements 21 become more nearly horizontal. Thus, rotation of the rods or tubes 4 and 5 about their own longitudinal axes occur, the movement of the rod 4 being counter-clockwise as seen in Fig. 4, and the rotation of rod 5 being clockwise as seen in the same figure. In other words, the rotation of the two rods is in opposite senses.

At the same time, there may have been a movement of the rods first to the left, as shown in Fig. 2, and again to the right, because of the curved movement of the clevis in following the end of the lever 15. This movement is accommodated by a sliding through the bearings 17, or by a movement of the pivot in the slot 24. If sliding in the bearing 17 is to occur, the collars secured by screws 18 must be spaced slightly away from the bearing proper to accommodate it.

The rotation of the rods 4 and 5 causes a rotation of the clamps 28 shown in Fig. 3, and the parts in said figure move from the dotted line position to the position shown in full lines. This movement is limited by the stops 31 which, when they abut, prevent further rotation of the rods 4 and 5 in this direction. The stop occurs when the arms are slightly past the straight-line connection between the centers of the rods 4 and 5, thereby affording a slight toggle action which firmly holds the parts in their closed position until positively moved in the opening direction. The links 29 while moving from the dotted line position to the position shown in full lines in Fig. 3, force the rods 4 and 5 apart, and thereby force the ends of the rods against the correspondingly turned surfaces 8 in the jaws shown in Fig. 6.

The movement of the rods away from one another is slightly greater than the movement needed to produce mere touching of the rods and the jaws. The rods are, therefore, strained and rotated in contact with the jaws. The slight relaxation upon the pivot 30 passing the dead center and permitting the toggle to lock is not enough to completely relax the strain, but the rods 4 and 5 remain in firm contact with the jaws 6. The straining results in a flexing of the rods. Over the short distance from the clamps 28 to the jaws, the flexing is slight, but over the long distance between the clamps 28 and the bearings 17 considerable flexing may occur without producing much distortion. The flexing results in a pressure between the rods and the jaws by which firm contact is assured. The rotation during contact making causes a grinding action by which any ice, dirt or corrosion on the jaws or on the corresponding part of the rods is abrasively removed.

At the beginning of the opening movement, the first effect of moving the lever 15 clockwise (Fig. 2) is to rotate the rods 4 and 5 and unlock the toggle shown in Fig. 3; then the toggle shown in Fig. 4 moves from its full line position toward the position shown in dotted lines. When it arrives at the dotted-line position, the lever 15 has arrived at the position shown in dotted lines in Fig. 2. Further movement of the lever cannot rotate the rods 4 and 5 about their lengths as axes because the toggle cannot straighten any further. The rotation of the rods which occurred during the movement from the full line position of Fig. 4, to the dotted-line position, was accompanied by a movement of the clamps 28 and the toggle associated with them to the dotted-line position shown in Fig. 3, and, therefore, the rods were drawn toward each other as shown by the dotted lines in this figure. This separated the rods from the jaws 6 far enough to take them out of the depressions 8 and enable them to move upward without further contact with the jaws.

After the parts have reached their dotted-line positions, further movement of the lever 15 will be accompanied by a rotation of the shaft 10, because the lever 15 cannot rotate further in this direction about the pivot 26. As the shaft 10 is rotated by the further movement of the lever 15, the rods 4 and 5 rotate also about the axis of the shaft 10 and their ends leave the jaws 6, which completes the opening movement of the switch.

Many variations in detail will occur to those skilled in the art and the specific description and illustration of the device here given is not to be regarded as a limitation. The only intended limitations are expressly indicated in the claims.

I claim as my invention:

1. A switch member including two long elements, mechanism near one end of the member for causing relative rotation of each of the elements about its length as an axis, mechanism near the other end of the elements actuated by such relative rotation, and contact insuring means actuated by said mechanism.

2. In a disconnecting switch, a pair of switch jaws, a pair of movable conductors, means for moving said conductors about an axis remote from said jaws to remove them from between the jaws or to return them thereto, means effective upon the completion of said movement in the last-named direction about said axis for causing relative movement between said conductors and said jaws, said movement including a rotation of each of said conductors about an axis of its own different from the first said axis to obtain wiping action on the switch jaws.

3. In a disconnecting switch, a jaw, a pair of movable blades, means for moving said blades into proximity to said jaw, said blades each having a surface of revolution, said jaw having a surface formed to engage each of said surfaces of revolution, means effective when said blades are in proximity to said jaw for moving the blades into coacting position relative to said jaw, and means for rotating each of said blades about the axis of its surface of revolution to cause rubbing action between it and the jaw.

4. In a disconnecting switch, a jaw, a pair of rods pivotally mounted at a distance from said jaw to swing into proximity thereto, means for moving said rods about said pivot including two elements one of which is connected to each of said rods to rotate each of them about its own axis, said rods each having a surface of revolution coaxial therewith and adjacent to said jaw when the rod is in proximity thereto, a cooperating surface on said jaw and said means acting when said pivotal movement is completed to cause wiping between said surfaces due to said rotation.

5. In a disconnecting switch, insulating supports, jaws connected together on one of said supports, bearings supported from other of said supports, rods mounted in said bearings to rotate about their lengths as axes, said rods and bearings being mounted to rotate together about an axis transverse to said rods, said rods extending from said other supports toward said jaw support and being received between the jaws at one limit of the motion about said last-named axis and moving out from between the jaws on rotation away from said limit, an arm for rotating said bearings and rods about said transverse axis, a lever mounted on said arm, a toggle connecting said lever to said rods at points adjacent each other and remote from said bearings, said toggle including jointed members, each jointed member having an element rigidly connected to a rod to turn the same about its length as an axis when the jointed members are moved relative to each other, a second toggle comprising elements one secured to each rod at points opposite each other, the elements of said second toggle being pivotally joined together whereby when the angle between said elements becomes smaller the rods are nearer together, the direction of rotation of the rods by the approach of the lever to the rods and consequent movement of the first-named toggle joint being such as to cause the last-named toggle joint to force the rods apart, the jaws having surfaces against which the rods bear when they are forced apart.

6. In a disconnecting switch, insulating supports, jaws connected together on one of said supports, bearings supported from other of said supports, rods mounted in said bearings to rotate about their lengths as axes, said rods and bearings being mounted to rotate together about an axis transverse to said rods, said rods extending from said other supports toward said jaw support and being received between the jaws at one limit of the motion about said last-named axis and moving out from between the jaws on rotation away from said limit, an arm for rotating said bearings and rods about said transverse axis, a lever mounted on said arm, a toggle connecting said lever to said rods at points adjacent each other and remote from said bearings, said toggle including jointed members, each jointed member having an element rigidly connected to a rod to turn the same about its length as an axis when the jointed members are moved relative to each other, a second toggle comprising elements one secured to each rod at points opposite each other, the elements of said second toggle being pivotally joined together whereby when the angle between said elements becomes smaller the rods are nearer together, the direction of rotation of the rods by the approach of the lever to the rods and consequent movement of the first-named toggle joint being such as to cause the last-named toggle joint to force the rods apart, the jaws having surfaces against which the rods bear when they are forced apart, and stops on the elements of the second toggle preventing rotation of the rods substantially beyond the position of greatest separation.

7. In a switch mechanism, a switch member having two elements, a shaft to which said switch member is connected and by which said switch member is rotated, an arm rigid with said shaft and by which said shaft may be rotated, a lever pivoted on said arm, a mechanism connecting a point on said lever remote from said arm and two points, one on each of said elements, equally distant from said shaft, whereby the effective length of said mechanism is altered by movement of said lever relative to said arm, said mechanism including means whereby such change of length causes movement relative to each other of the elements.

8. In a switch, a contact, a pair of blade members movable into and out of position to engage said contact, means pivoting said blade members together with the axis of the pivot extending generally parallel to the length of the blade members, and means for causing rotation at said pivoting means to force the blade members into engagement with said contact.

9. In a switch, a contact, a pair of blade members rotatably mounted about an axis transverse to the blade members to swing into and out of position to engage said contact, means pivoting said blade members together near the end adjacent said contact about an axis extending longitudinally of the blade members, and operating means for swinging said blade members about said transverse axis into position to engage said contact and for causing pivotal movement at said longitudinal axis to force said blade members into firm engagement with said contact.

10. In a switch, a contact, a pair of blade members movable into and out of position to engage said contact, means pivoting said blade members together to form a toggle with the axis of the pivot extending generally parallel to the length of the blade members, and means for causing straightening of said toggle to force the blade members into high pressure engagement with said contact, and stop means effective when said toggle has moved slightly over center for locking the toggle in straightened position.

11. In a switch device, a pair of cooperating contact making means, one of said contact making means including two blade members connected together at a point adjacent the other contact making means to form a toggle, and means for applying a rotating force to at least one of said blade members to rotate it about its longitudinal axis to straighten said toggle and force said blade members into good contact with the other contact making means.

12. In a switch device, a contact, a pair of blade members, means mounting said pair of blade members for movement into position to engage said contact, means mounting at least one of said blade members for rotation about an axis extending generally longitudinally of the blades, and means actuated by said rotation of said blade for changing the lateral spacing of said pair of blades to cause high pressure engagement with said contact.

13. In a switch device, a contact, a pair of blade members, means mounting said pair of blade members for movement into position to engage said contact, means mounting at least one of said blade members for rotation about an axis extending generally longitudinally of the blades, and means actuated by said rotation of said blade for changing the lateral spacing of said pair of blades at a point spaced from said contact to cause the resiliency of said blades to supply contact pressure.

14. In a switch device, a contact, a pair of blade members, means mounting said pair of blade members for movement into position to engage said contact, means mounting at least one of said blade members for rotation about an axis extending generally longitudinally of the blades, and means actuated by said rotation of said blade for changing the lateral spacing of said pair of blades to cause high pressure engagement with said contact and said rotation of said blade causing it to engage said contact with a wiping action.

RAY P. JACKSON.